(12) United States Patent
Rehg et al.

(10) Patent No.: US 7,645,535 B2
(45) Date of Patent: Jan. 12, 2010

(54) METHOD AND MATERIALS FOR BONDING ELECTRODES TO INTERCONNECT LAYERS IN SOLID OXIDE FUEL CELL STACKS

(75) Inventors: Timothy Joseph Rehg, Huntington Beach, CA (US); Jie Guan, Torrance, CA (US); Kurtis C. Montgomery, Torrance, CA (US); Atul Kumar Verma, Irvine, CA (US); Gregory Robert Lear, Madison, NJ (US)

(73) Assignee: General Electric Company, Schnectady, NY (US)

( * ) Notice: Subject to any disclaimer, the term of this patent is extended or adjusted under 35 U.S.C. 154(b) by 240 days.

(21) Appl. No.: 11/271,946

(22) Filed: Nov. 14, 2005

(65) Prior Publication Data

US 2007/0111069 A1    May 17, 2007

(51) Int. Cl.
H01M 8/12  (2006.01)
H01M 8/10  (2006.01)
H01M 2/00  (2006.01)
H01M 2/02  (2006.01)
C04B 35/64 (2006.01)

(52) U.S. Cl. .................. 429/32; 429/30; 429/36; 429/34; 264/618

(58) Field of Classification Search .......... 429/32, 429/30, 36, 34
See application file for complete search history.

(56) References Cited

U.S. PATENT DOCUMENTS

| | | | |
|---|---|---|---|
| 3,460,991 A | 8/1969 | White, Jr. | |
| 3,522,097 A | 7/1970 | Tedmon, Jr. et al. | |
| 3,533,849 A | 10/1970 | Mitoff | |
| 3,573,993 A | 4/1971 | Pabst et al. | |
| 4,459,341 A | 7/1984 | Marchant et al. | |
| 4,767,518 A | 8/1988 | Maskalick | |
| 4,770,955 A | 9/1988 | Ruhl | |
| 4,789,561 A | 12/1988 | Schaefer et al. | |
| 4,847,173 A | 7/1989 | Mitsunaga et al. | |
| 4,883,497 A * | 11/1989 | Claar et al. ............. | 29/623.5 |
| 4,894,297 A | 1/1990 | Singh et al. | |
| 4,997,725 A | 3/1991 | Pujare et al. | |
| 5,001,021 A | 3/1991 | Maricle et al. | |
| 5,021,304 A | 6/1991 | Ruka et al. | |
| 5,037,525 A | 8/1991 | Badwal | |
| 5,057,362 A | 10/1991 | Schroeder et al. | |
| 5,064,733 A | 11/1991 | Krist et al. | |
| 5,114,803 A | 5/1992 | Ishihara et al. | |
| 5,122,425 A | 6/1992 | Yoshida et al. | |
| 2002/0102450 A1 * | 8/2002 | Badding et al. ............... | 429/32 |

FOREIGN PATENT DOCUMENTS

| | | | |
|---|---|---|---|
| JP | 09-306514 | * | 11/1997 |
| WO | WO 9728572 | * | 8/1997 |

OTHER PUBLICATIONS

European Search Report.

* cited by examiner

*Primary Examiner*—Patrick Ryan
*Assistant Examiner*—Angela J. Martin
(74) *Attorney, Agent, or Firm*—Nixon & Vanderhye P.C.

(57) ABSTRACT

A method and related bonding compositions for use in assembling a solid oxide fuel cell ("SOFC") stack having thermally and chemically stable and electrically conductive bonds between alternating fuel cells and interconnect components in the stack. The improved method and materials allow for the assembly of solid oxide fuel cells having a stronger and more reliable bond with good electrical contact in situ between the SOFC interconnect layers (plates) and the electrodes. The bonding materials and method according to the invention provide good electrical performance while maintaining the mechanical and electrical integrity of SOFC stacks without requiring excessive mechanical compression of the stack as exemplified by prior art systems. The preferred bonding agents comprise a primary phase that provides the electrical conduction path during fuel cell operation, as well as the mechanical strength necessary to insure a reliable connection between the interconnect and the relevant anode or cathode surfaces of the fuel cell. Secondary phases can be added in small amounts to the primary phase to improve adhesion. An exemplary method according to the invention also contemplates various different steps for pre-treating the surfaces of the interconnect plates and electrodes to improve their surface bonding properties.

9 Claims, No Drawings

METHOD AND MATERIALS FOR BONDING ELECTRODES TO INTERCONNECT LAYERS IN SOLID OXIDE FUEL CELL STACKS

BACKGROUND OF THE INVENTION

The present invention relates to a method for bonding the electrodes in solid oxide fuel cell ("SOFC") stacks to the interconnect layers in such stacks and, more particularly, to an improved method and materials for assembling solid oxide fuel cells to form a permanent, thermally and chemically stable bond between the electrodes and interconnects with good electrical contact between the electrodes and interconnect components. The present invention also relates to the specific compositions used in the bonding method.

A fuel cell is an energy conversion device that electrochemically reacts a fuel with an oxidant to generate a direct current. In a typical fuel cell, the cathode material provides the reaction surface for the oxidant and the anode material provides the reaction surface for the fuel. The electrolyte separates the oxidant and the fuel and allows for ionic transport of the reactant. The fuel and oxidant fluids (typically gases) are continuously passed through separate cell passageways with the discharges from the fuel cell removing the reaction products and heat generated in the cell.

Solid oxide fuel cells ("SOFC") typically are formed by stacking a series of planar interconnect layers (often called "plates" or "interconnects") and the fuel cells to form an integral fuel cell stack assembly. Most solid oxide fuel cell designs thus include two basic subassemblies, namely the fuel cells and related interconnect plates, stacked on top of one another in alternating fashion. These basic components of the stack must be assembled such that they remain together with good electrical contact at all times in order to reduce ohmic losses. Gaskets/seals positioned between each of the interconnect plates and cells help to prevent the undesirable leakage of the gases used by the fuel cells. Normally, a constant clamping force must also be exerted on the stack to ensure proper sealing and electrical contact during operation.

Currently, two basic stack constructions are used for SOFCs, i.e., planar cell stacks and tubular cell stacks/bundles. In both designs, the mechanical integrity of the stack and electrical contact between the fuel cells and interconnect subassemblies typically occurs through direct mechanical compression. In some cases, the stack components have also been "glued" together using sealing materials such as high temperature glasses and cements at the cell edges. The electrical contact between finished surfaces has also been improved somewhat by using a flexible/ductile conductive felt material, such as carbon paper in the case of proton exchange membrane fuel cells or metal foam/mesh/felts in the case of conventional SOFC stacks. However, heretofore the physical bond strength and electrical conductivity between electrodes and interconnects has been a significant limiting design problem with SOFCs.

Although the use of mechanical compression in fuel cell assemblies is a well-known technique for maintaining good mechanical integrity and electrical contact, a number of significant design issues still remain with such assemblies. For example, in order to ensure good electrical contact, a considerable amount of compression is normally required. However, excessive compressive forces are often undesirable in SOFC assemblies due to the inherent brittleness of certain ceramic components and the low dimensional tolerances associated with certain individual stack components.

In addition, the known compression mechanisms are often bulky and heavy due to the plurality of bolts/rods and thick end plates required to effectuate uniform compression. The use of such bulky loading/compression mechanisms adds cost and weight to the stacks, as well as a significant thermal mass.

Most conventional tie rod and bellows materials also tend to lose strength and creep over time under typical SOFC operating temperatures such as 600-1,000° C. That is, the compression load may ultimately become compromised due to changes and differences in mechanical properties of the tie rods and bellows at elevated operating temperatures. As a result, thermal expansion differences between the stack components and compression mechanisms must be carefully designed and monitored. Otherwise, the compression forces could vary during the thermal cycling and result in the loss of mechanical and electrical integrity of the stack.

In some prior art SOFC designs, bonding agents comprising conductive powders have been used to provide electrical connection between the cells and interconnect subassemblies. However, the adhesion between the subassemblies using such bonding agents is known to be poor, primarily because insufficient bonding strength develops between the two components when the stacks operate at temperatures between 600 and 1,000° C.

In addition, an excessively strong adhesive bond between fuel cells and interconnects with different thermal expansion properties can generate unwanted thermal stresses and cause delamination, deformation, or even cell fracture during thermal cycling. Obviously, poor adhesion and delamination during thermal cycling inevitably have detrimental effects on the overall stack integrity and the electrochemical performance of the stack. Thus, a proper bonding method with thermally compatible materials is essential to providing an effective electrical conduction path while at the same time ensuring adequate bond strength to meet the combined electrical, thermal, and mechanical needs of the SOFC stack. Various approaches to improving the electrical contacts and bonding materials and their functionality have been attempted in the past. For example:

U.S. Pat. No. 6,703,154 discloses the use of a spring-loaded compression bellows in solid oxide fuel cell stacks to reduce the thermal stress caused by direct mechanical compression. The compression bellows improve the stack's tolerance to thermal cycling. However, one obvious problem with this approach concerns the selection of suitable high temperature resistance alloys for the bellow shells since most alloys tend to creep and lose stiffness at high temperatures.

U.S. Patent application 20040101742 discloses a current collector comprising an electrically conductive mesh spacer between each electrode and its adjacent interconnect. In order to maintain good electrical contact under compression, a compliant spacer or buffer layer such as metal felt, flexible mesh or metal foam must be placed between the current collectors and cells. The mesh spacer is secured to the interconnect plate through brazing or welding and the mesh is resilient to maintain mechanical and electrical contact with the electrodes and interconnect plates during assembly and operation. Although contact can be improved with such current collectors, an excessive compression force is still necessary to maintain good electrical contact between the current collectors and electrodes.

U.S. Pat. No. 5,922,486 discloses a method for joining multiple solid oxide fuel cell units using co-firing. "Buffer" layers are interposed between each of the electrodes and the interconnect layer to improve the conductivity and bonding. The buffer layers joining the interconnect layers and electrodes (both the cathode and anode) comprise either $CuO+NiO+La_{0.8}Sr_{0.2}MO_3$ or $CeO_2+NiO+La_{0.8}Sr_{0.2}MnO_3$. Since $La_{0.8}Sr_{0.2}MO_3$ tends to decompose under a reducing atmosphere (anode side) and the conductivity of NiO is limited under an oxidation atmosphere (cathode side), the bonding strength and electrical properties can be compromised using this system. Also, the disclosed process is limited to ceramic interconnects which comprise either $La_{0.7}Ca_{0.3}CrO_3$ or $La_{0.8}Sr_{0.2}CrO_3+CaCO_3$ and require a higher co-firing temperature (typically 1,275° C.) in order to achieve an effective bond.

U.S. Pat. No. 5,290,642 (Minh et al., GE, 1994) teaches an assembly and bonding method for monolithic solid oxide fuel cells in which the bonding agents are formed by mixing a powder of anode materials for the anode bonding agent or a cathode ceramic powder for the cathode bonding agent. The agents are applied in order to wet the densified monolithic structure components and then heat treated in a furnace or microwave to sinter and densify the bonding agent. Again, one distinct disadvantage of this prior art technique is that it bonds the ceramic interconnect layer to the cathode and anode at relatively high temperatures.

U.S. Pat. No. 5,702,823 teaches a method for producing anode bonding materials for anode-to-anode bonding and anode-to-interconnect bonding in solid oxide fuel cells. The anode/interconnect bonding material includes powders of reactive ingredients with nickel oxide, zirconium oxide, cobalt oxide, calcium oxide or strontium oxide as the major components. The reactive ingredients are selected from tungsten, tantalum, niobium, molybdenum and titanium. Ceramic powders are mixed with organic binders and solvents to form a bonding slurry that can then be brushed or sprayed onto the surfaces of the anode and interconnect pairs to be bonded. The bonding operation takes place at temperatures between 1,000-1,300° C. and the bond materials react with the anode and/or interconnect materials to provide the requisite bond. Again, the bonding temperature is too high for typical stack assembly operation which generally falls in the range of 600 to 1,000° C.

Various prior art electrically conductive coatings have also been proposed to improve the surface of current collectors, i.e., to reduce contact resistance including, for example, $Ag-La_{0.8}Sr_{0.2}CrO_3$ coatings (see C. Hatchwell et al., Journal of Power Sources, p. 64, 1999), or spinel and perovskite coatings (see Y. Larring et al., J. Electrochem. Soc., p. 3251, 2000), and $LaNi_{0.6}Fe_{0.4}O_3$ (see R. Basu et al., J. Solid State Electrochem, p. 416, 2003).

In the past, active brazing has also been proposed to join the ceramic cells to metallic interconnect layers. However, the brazing process itself has proven to be difficult and less effective due to the materials instability and potential interactions between the active brazing materials and electrodes under normal processing and operating conditions.

BRIEF DESCRIPTION OF THE INVENTION

The present invention provides a new method and composition for forming structurally sound, thermally stable and electrically conductive bonds between the fuel cells and interconnect components in a solid oxide fuel cell stack. In particular, the present invention provides an improved method and materials for assembling solid oxide fuel cells to form a stronger and more reliable bond with good electrical contact in situ between the interconnect layers (plates) and the electrodes. Significantly, the bonding materials and method in accordance with the invention provide improved electrical performance while maintaining the mechanical integrity of SOFC stacks without requiring excessive mechanical compression of the stack exemplified by prior art systems.

The method according to the invention includes the steps of assembling the SOFC stacks by introducing a cathode bonding agent between the cathode and cathode side of the interconnect plate, together with an anode bonding agent positioned between the anode and anode side of the interconnect plate. The bonding agents can be in form of a slurry or paste and applied directly to the interconnect, the electrodes, or both, thereby forming an initial temporary bond. Upon heating to near operating temperatures, the bonding agents according to the invention permanently bond the stack components in-situ mechanically and electrically.

Useful bonding agents for both the anode and cathode components comprise electrically conductive materials that remain stable and compatible with neighboring components in SOFC processing and operating environments. They also provide an effective electrical flow path between the cells and interconnect subassemblies. Thus, they typically comprise conductive metal and/or ceramic materials that can be applied in the form of a paste or slurry. Alternatively, they can be applied to the fuel cells or interconnects in the form of flexible tapes or transfer films.

Exemplary bonding agents according to the invention can be formed by mixing the desired ceramic/metal powders with an organic fluid vehicle. The mixture is then applied between the cells and the interconnect plates during the stack assembly process to form an initial cohesive bond. During the subsequent stack assembly heating and reduction process, the organic components burn out, leaving the electrically conductive materials bonded to the cells and interconnects, thus providing a good electrical connection between the cell and interconnect layer while maintaining a strong adhesive bond. The bonding material alone provides the required mechanical strength and integrity for the cells and interconnects at nominal stack operating temperatures.

Unlike prior art assembly techniques, the present invention does not rely on excessive compression forces to provide the necessary mechanical integrity and electrical contact. Instead, the assembly relies primarily on conductive bonding agents to provide the requisite mechanical and electrical requirements for SOFC stacks without undue compression being required. In addition, by modifying the component interfaces and incorporating certain selected additives in the bonding agent formulations (discussed below), the new method improves the contact, bonding strength and overall electrochemical performance of SOFC stacks.

DETAILED DESCRIPTION OF THE INVENTION

As noted above, the present invention has particular application to solid oxide fuel cell units having a plurality of interconnects and the anodes and cathodes separated by dense electrolytes. Each anode is physically bonded to and electrically contacted to the interconnect plate through a conductive anode bonding agent, while the cathode is physically bonded to and electrically contacted with cathode side interconnect through a cathode bonding agent. Bonding agents according to the invention can be applied directly onto the interconnect, electrodes, or both. As noted above, upon heating to near operating temperatures, the agents in-situ permanently bond the unit components mechanically and electrically.

The preferred anode bonding agents include a primary phase that provides the electrical conduction path during fuel cell operation, as well as most of the mechanical strength necessary to insure a reliable connection between the interconnect and the anode surface of the fuel cell. Secondary phases added in small amounts (also described below) provide additional benefits to the primary phase such as improved adhesion, thermal expansion mismatch compensation and improved catalytic properties.

The primary phase of the anode bonding agent comprises powders/flakes selected from at least one of the following: Ni, Ag, Au, Pt, Pd, Rh, Cu, Co, or oxides of those materials capable of being reduced to a conductive phase during fuel cell operation. The primary phase of the anode bonding agent can also include materials such as doped cerium oxide or doped $SrTiO_3$ or other like oxides that provide adequate electrical conductivity.

Exemplary secondary phases of anode bonding agents added to improve adhesion include bismuth oxide which melts at a temperature near the nominal SOFC operating temperature of 800 to 900° C. As this phase melts, it improves the adhesion of the bonding agent to the porous anode surface. Materials such as zirconium oxide, $TiO_2$, $Al_2O_3$, MgO, manganese oxides can likewise be added in varying amounts to modify the primary phase and improve the reliability of the bond layer. The addition of doped cerium oxide, copper oxide, cobalt oxide, $Ni_{0.5}Co_{0.5}O$, $SrTiO_3$ and precious metals, such as Rh, Pd, Pt also help to promote internal reforming when using a bonding material. Such materials are also easier to employ than catalyzing the interconnects or anode components.

Ceramic powders useful for bonding the anode can be mixed with a binder system such as PVB, PVA or ethyl hydroxyethyl cellulose and solvents such as alpha terpineol, ethanol, propanol, or other suitable solvents for a given binder system. The preferred volume fraction of solids to liquid loading is about 40%/60%. It is preferable to include a mixture of fine and coarse powders in order to enhance the sintering capability and improve particle packing and bond agent rheology. The preferred bonding materials according to the invention should also have the solids loading and particle size balanced so that any stresses developed during thermal cycling are minimized.

As discussed above, the anode bonding agents according to the invention can be applied directly to the anode, or to the interconnect plate, or to both components during stack assembly. The subsequent heating steps serve to burn out the organics, leaving a permanent adhesive bond. The heating steps can also reduce oxides, resulting in potential changes to the final bond material dimension while minimizing contact standoffs.

It has been observed that when the primary phase of the anode bonding agent comprises NiO powders or flakes, any significant reduction of NiO to Ni during the stack assembly and testing process may result in volumetric shrinkage that could weaken the mechanical and electrical contact between the cell anode and the anode side interconnect. Regardless, in most cases, anode bond pastes containing Ni flakes and/or Ni powders rather than NiO have been found to cause less dimensional changes in the final stack assembly and hence better overall mechanical strength and electrical contact.

In order to improve the adhesive properties of bonding agents to the anode, it has also been found that the anode surface can be pretreated with a coating of organo-metallic compounds comprising noble metals (such as Pt, Ag, Au, Rh or Pd) and/or Bi, Ni, Cu, Ce, Mn, or Co. The coatings are applied using known deposition techniques such as spin coating, screen-printing, spraying, or brushing. The coatings are then fired to burn out the organics and form thin metal or metal oxide layers bonded to the anode surfaces. Alternatively, a slurry or paste of anode bond material can be applied to the sintered anode surfaces and fired at temperature between about 900 and 1,300° C. to form bonded, roughened surfaces that help the anode and the interconnect layers to become fully bonded during the heating process.

For example, a paste containing NiO has been applied to a sintered anode surface and fired at 1,250° C. for one hour to pre-treat the anode surface (by forming a well-bonded, roughened surface). The pre-treated surface resulted in a higher bond strength to the interconnect materials with an anode bonding paste containing NiO. The higher bond strength between the cell anode and anode side interconnect also improved the mechanical adhesion between the cell and metallic interconnect while reducing the electrical contact resistance.

Another type of anode configuration can be formed by screen-printing or spraying a thin layer of bonding materials to the anode which is then co-fired together with the anode. All of these pre-treatments generate the desired material properties and roughness at the anode surface and result in an improved bond and electrical contact.

Exemplary cathode bonding agents according to the invention include primary powders selected from the group of doped lanthanum strontium manganites (LSM), praseodymium strontium manganites (PSM), lanthanum strontium ferrites (LSF), and lanthanum strontium cobaltities (LSC), Mn—(Co, Cr, Ni) spinels, or a conductive pervoskite in the general form of(La, Ce, Pr)—Sr—(Fe, Co, Ni, Mn)$O_3$. Secondary components for cathode bonding agents, such as noble metal (Pt, Pd, Rh, Ag) and their oxides, CuO, $La_2O_3$, SrO, manganese oxides, cobalt oxides, $Li_2O$ and doped ceria, can be added to improve the adhesion, conductivity, catalytic activities and bond strength. Materials such as zirconium oxide and $TiO_2$ can also be added in varying amounts to provide thermal expansion modifications to the primary phase for improved reliability of the final bond layer.

It has also been found that ceramic powders useful for bonding the cathode can be mixed with a binder agent such as PVB, PVA or ethyl hydroxyethyl cellulose and solvents such as alpha terpineol, ethanol, propanol, or other suitable solvents for a given binder system. Again, the preferred volume fraction of solid to fluid loading is 40/60%. The bond paste is likewise applied onto the cathode and interconnect layer, or both, during stack assembly. Upon heating to near operating temperatures, the bonding materials form a strong in-situ bond between the cathodes and interconnect.

In order to further improve the bonding of the cathode to the interconnect, it has also been found that the interconnect surfaces can be pre-treated with materials similar to the bond materials, such as an LSM, LSC, or Mn—Co spinel coating for the cathode side interconnect. The coatings can be applied using various known deposition techniques, such as spin coating, dip coating, screen-printing, sputtering, spraying or brushing and then fired to achieve good bond coatings. Alternatively, the interconnect material can be pre-oxidized at moderate temperatures (600-900° C.) to form strong adhesion oxide layers that can be bonded to the electrodes. Again, all of these pre-treatments serve to prepare a better interconnect surface finish for a strong and reliable bond between the interconnects and fuel cells.

As with the anodes, preferred conductive materials useful in bonding the cathode include mixtures of fine and coarse powders to achieve a better sintering ability, particle packing and bond agent rheology. Cathode bond pastes made with both fine powders and heat-treated coarse powders thus improve the rheology when applying the paste and provide better contact. Dimensional changes also tend to be more reduced during the stack assembly and testing processes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for assembling solid oxide fuel cells into an integrated solid oxide fuel cell stack of the type having a plurality of cells each with a cathode and an anode separated by an electrolyte and a plurality of metallic, non-ceramic interconnect plates, said method comprising the steps of:
   (a) pre-treating the surfaces of said metallic interconnect plates by applying an oxide coating comprising LSM, LSF, LSC, $La_2O_3$, manganese oxides, cobalt oxides or Mn—Co spinels to the cathode side interconnect surface, and applying a Ni, NiO, Co, CoO, or $Ni_{0.5}Co_{0.5}O$ coating to the anode side interconnect surface;
   (b) pre-treating the surfaces of said anodes to improve the bonding properties by applying an anode paste or a coating of organo-metallic compounds comprising Bi, Ni, Mn, Cu, Ce, and Co;
   (c) introducing a cathode bonding agent between each one of said cathodes and the cathode side of each one of said metallic interconnect plates;
   (d) introducing an anode bonding agent between each one of said anodes and the anode side of each one of said metallic interconnect plates;
   (e) combining said plurality of electrodes and metallic interconnect plates having said bonding agents applied thereon into an integrated oxide fuel cell stack; and
   (f) uniformly heating said integrated solid oxide fuel cell stack without applying a compressive load to a temperature in the range of about 600-1000° C. and for a period of time sufficient to permanently bond said metallic interconnect plates to said cathodes and anodes.

2. The method according to claim 1, wherein the steps of introducing said anode and cathode bonding agents includes combining one or more conductive metals or ceramics with an organic fluid to form said bonding agents and applying said bonding agents to said electrodes and metallic interconnect plates in the form of a paste or slurry.

3. The method according to claim 2, wherein said heating steps burn away the organic fluid leaving an electrically conductive material bonded to said electrodes and said metallic interconnect plates.

4. The method according to claim 1, wherein the steps of introducing said anode and cathode bonding agents is accomplished by using a flexible tape or transfer film.

5. The method according to claim 1, wherein said step of pre-treating the surfaces of said anodes uses spin coating, screen-printing, spraying or brushing to apply said coating followed by firing to burn out any organics and form a thin metal or metal oxide layer bonded to the anode surfaces.

6. The method according to claim 1, wherein said step of pre-treating the surfaces of said anodes includes the use of a slurry or paste of the anode bond material applied to the sintered surfaces of said anodes and then fired at a temperature between about 800 and 1,300° C. to form rough surfaces for bonding with corresponding metallic interconnect layers.

7. A method according to claim 1, wherein said cathode bonding agent comprises doped lanthanum strontium manganites (LSM), praseodymium strontium manganites (PSM), lanthanum strontium ferrites (LSF), lanthanum strontium cobaltities (LSC), Mn—(Co, Cr, Ni) spinels and a conductive pervoskite in the general form (La, Ce, Pr)—Sr—(Fe, Co, Ni, Mn)$O_3$.

8. A method according to claim 1, wherein said cathode bonding agent further comprises noble metals Pt, Pd, Rh, Ag, and their oxides, CuO, $La_2O_3$, SrO, manganese oxides, cobalt oxides, $Li_2O$, doped ceria, zirconium oxide and $TiO_2$.

9. A method for assembling solid oxide fuel cells into an integrated solid oxide fuel cell stack of the type having a plurality of cells each with a cathode and an anode separated by an electrolyte and a plurality of metallic interconnect plates, said method comprising the steps of:
   (a) pre-treating the surface of said metallic interconnect plates by applying an oxide coating comprising LSM, LSF, LSC, $La_2O_3$, manganese oxides, cobalt oxides or Mn—Co spinels to the cathode side of said metallic interconnect plates and Ni, NiO, Co, CoO, or $Ni_{0.5}Co_{0.5}O$ to the anode side of said metallic interconnect plates;
   (b) introducing a cathode bonding agent between each one of said cathodes and the cathode side of each one of said metallic interconnect plates;
   (c) introducing an anode bonding agent between each one of said anodes and the anode side of each one of said metallic interconnect plates;
   (d) combining said plurality of electrodes and metallic interconnect plates having said bonding agents applied thereon into an integrated oxide fuel cell stack; and
   (e) uniformly heating said integrated solid oxide fuel cell stack without applying a compressive load to a temperature in the range of about 600-1000° C. and for a period of time sufficient to bond said metallic interconnect plates to said cathodes and anodes.

* * * * *